R. SCOLLON.
MIXING DEVICE.
APPLICATION FILED SEPT. 8, 1916.
1,296,326.
Patented Mar. 4, 1919.
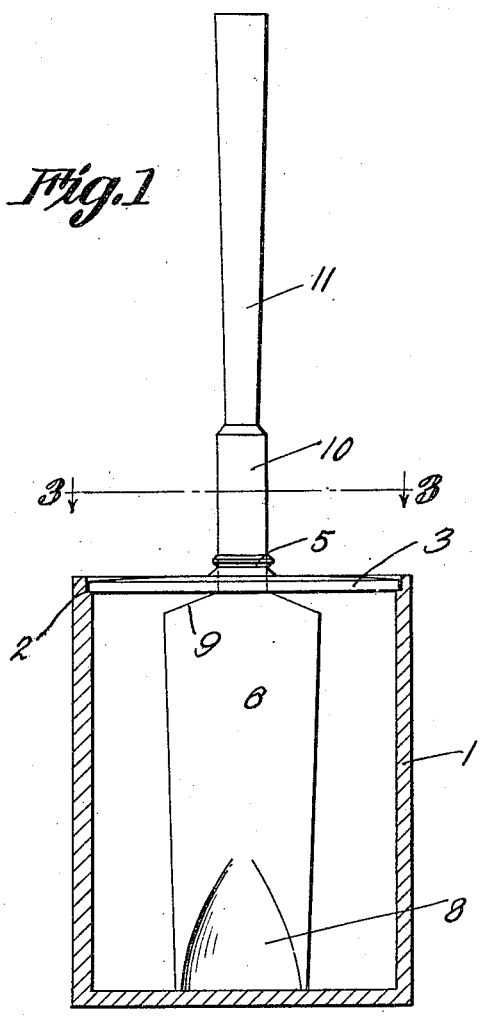
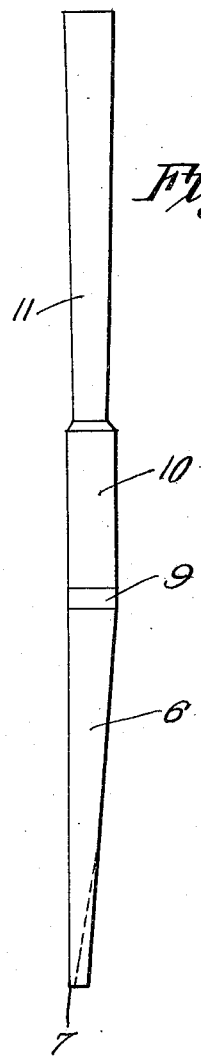
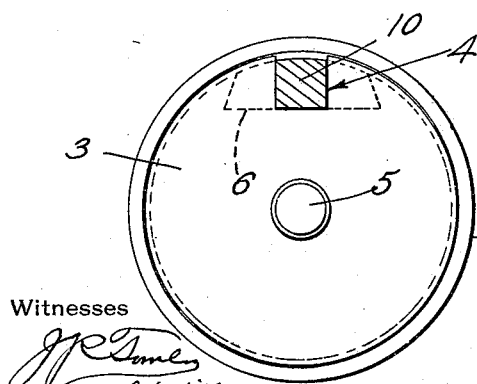
Richard Scollon,
Inventor
Witnesses
by C.A. Snow & Co.
Attorneys

UNITED STATES PATENT OFFICE.

RICHARD SCOLLON, OF BARNESBORO, PENNSYLVANIA.

MIXING DEVICE.

1,296,326.   Specification of Letters Patent.   Patented Mar. 4, 1919.

Application filed September 8, 1916. Serial No. 119,082.

*To all whom it may concern:*

Be it known that I, RICHARD SCOLLON, a citizen of the United States, residing at Barnesboro, in the county of Cambria and State of Pennsylvania, have invented a new and useful Mixing Device, of which the following is a specification.

This invention relates to means for mixing coloring matter with butter, oleomargarin, or like substances, one of its objects being to provide a simple form of mixer designed to be used in connection with an ordinary crock, and which when in position thereon will serve to protect the contents of the crock, and will also constitute means whereby said contents can be removed as desired.

A further object is to provide a paddle of novel form by means of which all portions of the contents of the crock can be reached during the mixing operation.

A still further object is to combine with the paddle a closure having an opening for the reception of the handle of the paddle, and which opening is adapted to be closed by said handle to prevent the admission of dirt or insects to the crock.

With the foregoing and other objects in view, the invention consists of certain novel details of construction and combinations of parts which will be hereinafter more fully described and pointed out in the claims, reference being had to the accompanying drawings in which—

Figure 1 is an elevation of the mixer and closure in position in a crock, said crock being shown in section;

Fig. 2 is a side elevation of the mixer; and

Fig. 3 is a section on line 3—3, Fig. 1.

Referring to the figures by characters of reference, 1 designates an ordinary crock such as used for holding butter or the like, this crock having a seat 2 in its upper end designed to support a disk like closure 3 in the peripheral portion of which is formed a rectangular opening 4. If desired a knob 5 or the like may be arranged upon the closure at the center thereof.

The mixing element is in the form of an elongated paddle 6, having broad, flat faces which diverge away from the active straight edge 7 thereof, one of these faces being preferably formed with a rounded recess 8 which extends inwardly from the free edge of the paddle. The side edges of the paddle preferably diverge away from the edge 7, and terminate in shoulders 9, which extend toward each other, and are spaced by a substantially rectangular stem 10 from which projects a handle 11. The parts are so prepared that when the paddle is resting on the bottom of the crock 1, the stem 10 is located in the recess 4, and fits snugly against the walls of the recess. One face of the stem 10 is rounded transversely so as to fit snugly against the inner surface of the wall of the crock when the paddle is in position in said crock.

In using the device for the purpose of mixing coloring matter with butter or the like, the ingredients are placed in the crock, after which the paddle 6 is worked back and forth through the material and around the same along the inner surface of the wall of the crock. As the back face of the paddle is rounded transversely to conform with the configuration of the crock, as indicated particularly in Fig. 3, it will be apparent that all portions of the contents of the crock can be reached and thorough mixing of the ingredients will thus be assured. After the mixing operation has been completed, the paddle is placed firmly against the wall of the crock, and the closure 3 is placed upon its seat 2 so that the stem 10 will extend through and entirely close the recess 4. When it is desired to remove any portion of the contents of the crock, the closure is removed and the paddle can then be used to dip out the material.

It will be understood that the paddle 6 may be corrugated or otherwise ornamented, so that the butter, in turn, may present a more or less ornamental appearance. This detail is a matter of design and has no bearing upon the invention. A specific delineation of the feature last above alluded to, therefore, has not been embodied in the drawings.

As the back face of the paddle is rounded transversely so as to be concentric with the wall of the crock when placed flat thereagainst, the paddle, when swung toward the wall, will press out all material lying between it and the wall, this thorough squeezing action greatly facilitating the mixing operation.

What is claimed is:

1. The combination with a container, of a closure removably and revolubly mounted thereon and provided with an angular recess in the periphery thereof, a paddle within the container and having its back face rounded transversely to lie concentric with the wall of the container when pressed thereagainst and having a flat front face, said faces converging toward one end of the paddle, there being a recess in the flat face of the paddle at the free end thereof, said recess being of varying depth, and a stem projecting from the paddle and having an angular portion fitting snugly within the peripheral recess in the closure, there being a handle upon the stem.

2. The combination with a container, of a mixing paddle therein having its back face rounded transversely and adapted, when pressed against the wall of the container, to lie concentric therewith, the front face of the paddle being flat and provided with a recess of varying width, the front and back faces converging toward the bottom of the paddle, and a stem projecting from the top of the paddle.

In testimony that I claim the foregoing as my own, I have hereto affixed my signature in the presence of two witnesses.

RICHARD SCOLLON.

Witnesses:
WILLIAM F. DILL,
WM. F. COY.

Copies of this patent may be obtained for five cents each, by addressing the "Commissioner of Patents, Washington, D. C."